Figure 1:
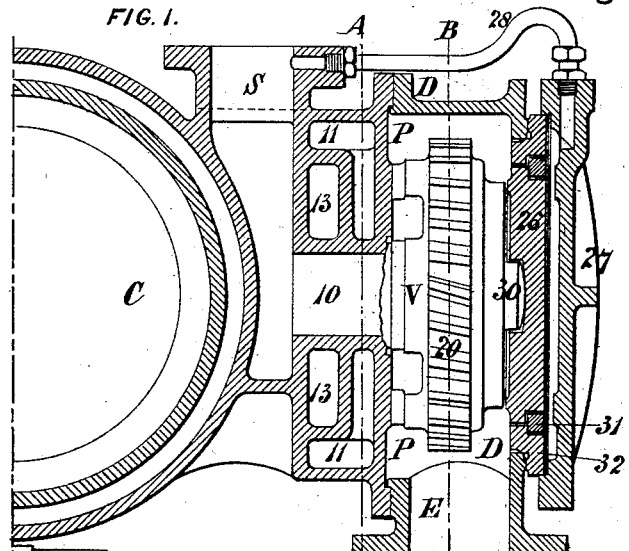

(No Model.) 2 Sheets—Sheet 1.

K. D. NOBLE.
VALVE FOR STEAM ENGINES.

No. 367,657. Patented Aug. 2, 1887.

Witnesses:
Hey. Barkoff
David S. Williams.

Inventor:
Kenneth David Noble
by his Attorneys
Howson & Son (No Model.) 2 Sheets—Sheet 2.

K. D. NOBLE.
VALVE FOR STEAM ENGINES.

No. 367,657. Patented Aug. 2, 1887.

Witnesses:
Jas. Bartoff
David S. Williams.

Inventor:
Kenneth David Noble
by his Attorneys
Howson & Son

N. PETERS, Photo-Lithographer, Washington, D. C.

UNITED STATES PATENT OFFICE.

KENNETH D. NOBLE, OF HELENSBURGH, COUNTY OF DUMBARTON, SCOTLAND.

VALVE FOR STEAM-ENGINES.

SPECIFICATION forming part of Letters Patent No. 367,657, dated August 2, 1887.

Application filed February 23, 1887. Serial No. 228,539. (No model.) Patented in England April 10, 1886, No. 4,998, and in France January 13, 1887, No. 180,869.

*To all whom it may concern:*

Be it known that I, KENNETH DAVID NOBLE, a subject of the Queen of Great Britain and Ireland, and a resident of Helensburgh, in the county of Dumbarton, Scotland, have invented certain Improvements in Distribution-Valves for Steam-Engines and other Fluid-Pressure Motors, (for which I have obtained British Patent No. 4,998, dated April 10, 1886, and French Patent No. 180,869, dated January 13, 1887,) of which the following is a specification.

My said invention has for its object to improve the construction and arrangement of distribution-valves for steam or other engines or motors, and to render such valves capable of being driven with little power and not liable to rapid wear or derangement.

My improved valves are of the rotating class, and have their acting faces in contact with port-faces, which are at right angles to the axes of the valves. The valves may be constructed or arranged so that the steam or motor fluid is first admitted to the casings containing the valves, and after operating in the cylinders is exhausted through the interiors of the valves. I, however, prefer to construct or arrange the parts so that the steam or motive fluid is first admitted into the interiors of the valves and exhausts into the casings. The interior of each valve communicates with ports in an annular face formed on the valve, these ports being radial and placed equidistantly round the valve. The cylinder port-face is made with corresponding ports, one half of them communicating with the passage to one end of the cylinder, and the other half with the passage to the other end, the two sets of ports being arranged alternately with each other round the circle. Between its steam-ports the valve is made with open spaces, which allow the exhaust to take place into the casing from those cylinder-ports which at any time are uncovered by the ported parts of the valve. For each double stroke of the cylinder-piston the valve has to rotate to the extent of the angular distance between the centers of two of its adjacent ports, so that the greater the number is of the ports the less will be the angle of rotation for each stroke. The valve may be made to rotate in any convenient way—as, for example, by means of teeth formed circumferentially on it and acted on by a worm or pinion driven from the engine-shaft in any convenient way.

The improved valves may be placed in various positions relatively to the cylinders, and in whatever position may be most convenient in any particular arrangement of engine, either at the side of the cylinder or at one end, or otherwise. Also, expansion or cut-off plates may be applied in connection with the valves when required, and in any cases in which it may be more convenient reciprocating rotary motion may be imparted to the valves, instead of continuous rotation.

Figure 2:
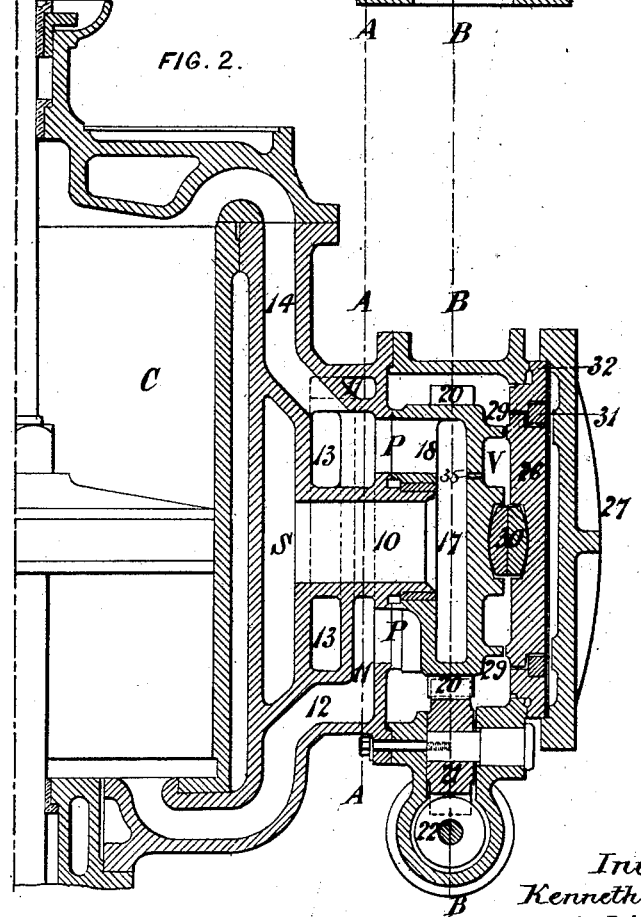
Figure 3:
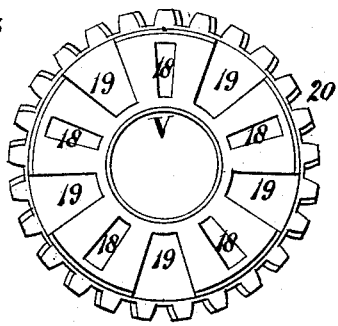
Figure 4:
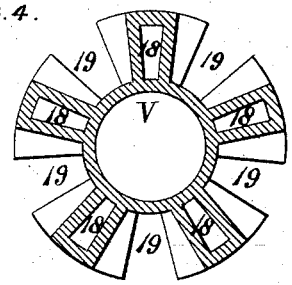
Figure 5:
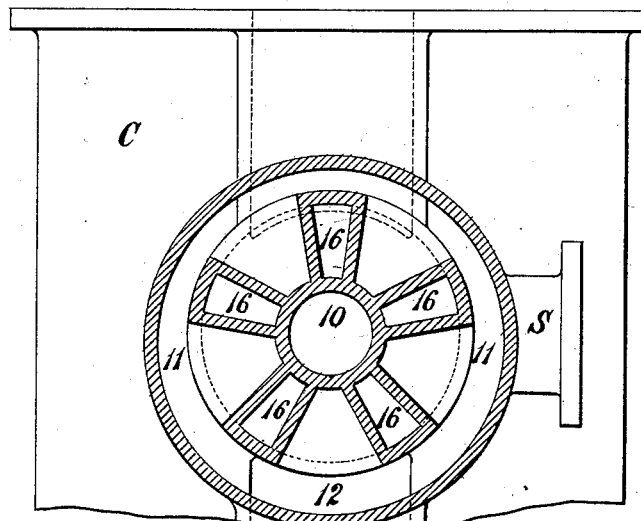
Figure 6:
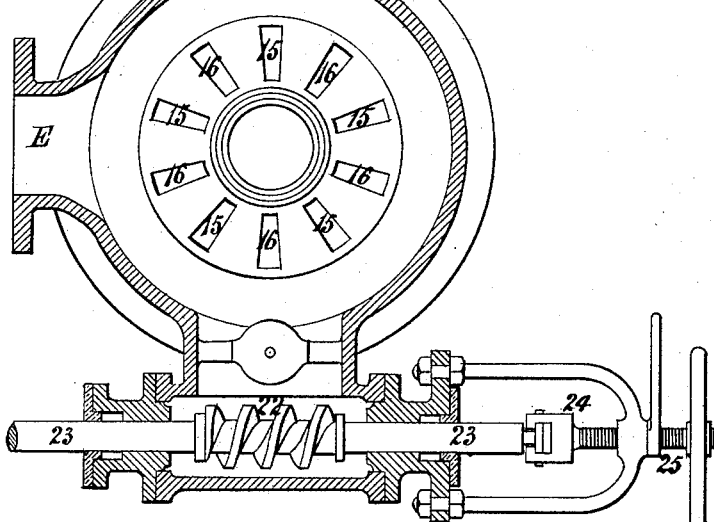

In the accompanying drawings, Figures 1 and 2 are respectively longitudinal sections, with the valve shown in elevation in Fig. 1 and in section in Fig. 2, while Fig. 3 is a face view of the valve, and Fig. 4 a section parallel thereto, Figs. 5 and 6 being sections, as at A A and B B in Figs. 1 and 2, the valve being supposed removed in Fig. 6.

In the drawings the same reference letters and numerals are used to mark the same or like parts wherever they are repeated.

In carrying out my invention the valve-casing D is placed at the side of the cylinder C, and the steam-inlet S is at one side between the cylinder and the port-face P, the steam reaching the valve V through a passage, 10, in the center of the port-face P. The central passage, 10, is formed partly in a short pipe, which projects out from the port-face P and serves as a center for the valve V to turn upon, a ring being interposed between it and the central opening of the valve. Under the port-face P two crescent-shaped passages are formed—one, 11, most fully shown in Fig. 5, communicating with one cylinder-passage, 12, and the other, 13, communicating with the other cylinder-passage, 14. The port-face P is formed with ten ports—five, 15, of these communicating with one passage, 11 12, and the other five, 16, with the other passage, 13 14, the ports 15 of one set alternating with those 16 of the other set. The valve V is made with a shallow circular chamber, 17, which receives the steam from the central passage, 10, and has in communication with it five ports, 18, formed in the valve-face which works on the cylinder port-face P. Open spaces 19 are formed between the ports 18 of the valve, and through these spaces the steam exhausts from one or other of the sets of cylinder-ports 15 16 into the space round the valve V and in the casing D, leaving the casing by the outlet E. The valve V is made with flanges at the sides of its ports 18 corresponding to the lap parts of an ordinary slide-valve. Teeth 20 are formed circumferentially on the valve V, and in gear with them there is a pinion, 21, which gears as a spur-wheel with a worm, 22, on a shaft, 23, passing out through stuffing-boxes. To one end of this shaft 23 rotation is imparted from the main shaft in any convenient way, while the other end is connected by a swivel-coupling, 24, to a screw-spindle, 25, fitted with a hand-wheel, by means of which the valve can be adjusted for lead.

The operations of reversing the engines and of varying the lead and cut-off may all be effected by moving the shaft 23 endwise by means of any convenient gearing. The shaft 23 may be driven by means of one or more sprocket-wheels on it and acted on by one or more endless pitch-chains from one or more sprocket-wheels from the main shaft; or any other convenient gearing may be used for the purpose. A single worm-shaft, 23, may be arranged to work the valves of two or more cylinders.

When the steam is admitted into the interior of the valve V from the center of the cylinder port-face P, it tends to press the valve from that face; and to oppose this pressure, and also to keep the valve against the port-face, a disk or diaphragm, 26, is applied in the cover 27 of the valve-casing D, (or in a part of the casing opposite the valve,) and steam is admitted behind this disk or diaphragm 26 by means of a small passage or by a pipe, 28. The counter-pressure disk 26 is made with an annular rib or flange to bear on a similar rib or flange, 29, on the back of the valve V; or it is provided with a central piece or pair of pieces, 30, of steel or other suitable hard metal or alloy, to bear on the center of the back of the valve; or both the annular and central bearing parts 29 30 may be used, as shown. When the valve V is made with an annular rib 29 in contact with a similar rib on the disk 26, steam may be admitted between the valve and disk to relieve the pressure and friction on the ribs. The steam may be so admitted through a small hole, 35, (dotted lines, Fig. 2,) in the back of the valve. The disk 26 is made of a suitable area for the purpose in view, and one or more sheets of thin metal are applied on its inner side to cover the joint between it and the rigid part of the cover 27 or casing. The disk 26 is, however, encircled by a ring, 31, which rests upon a fixed or rigid flange, 32, but which will move with the disk in the event of the valve V moving from the cylinder port-face P from any cause. When the valve V is moved from the port-face P, the pressure behind the disk 26 will act on the area of the disk increased by that of the ring 31, and there will consequently be a greater pressure tending to move the valve to the port-face than that which acts upon it when in contact with that face. The outer flange or ring, 32, which may be held between the cover 27 and the casing-flange, as shown, or which may be fixed to the cover or casing in any other convenient way, holds between itself and the cover the edges of the thin metal sheet or sheets which cover the joint of the disk 26.

What I claim as my invention is—

A rotary valve having a working-face at right angles to its axis and radial ports in the face communicating with the interior of the valve and alternating with spaces communicating with the valve-casing exteriorly to the valve, in combination with a cylinder port-face on which the valve-face works, and made with radial ports alternately communicating with passages leading to the opposite ends of the cylinder, a central opening in the valve communicating with its interior and with a passage leading the steam or fluid to or from the valve, and a counter-pressure disk connected to the valve and to the casing-cover, substantially as set forth.

In testimony whereof I have signed my name to this specification in the presence of two subscribing witnesses.

KENNETH D. NOBLE.

Witnesses:
 JOHN IRVING,
 J. S. FISHBOURNE.